(12) United States Patent
Joo et al.

(10) Patent No.: US 12,541,819 B2
(45) Date of Patent: Feb. 3, 2026

(54) METHOD FOR DESIGNING BINARY PHASE FILTER EXTENDING FIELD OF DEPTH AND FOR RECONSTRUCTING IMAGES AND ELECTRONIC DEVICE PERFORMING THE SAME

(71) Applicant: UIF (University Industry Foundation), Yonsei University, Seoul (KR)

(72) Inventors: Chulmin Joo, Goyang-si (KR); Baek Cheon Seong, Seoul (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 221 days.

(21) Appl. No.: 18/491,303

(22) Filed: Oct. 20, 2023

(65) Prior Publication Data

US 2024/0161239 A1 May 16, 2024

(30) Foreign Application Priority Data

Oct. 20, 2022 (KR) .................... 10-2022-0135479

(51) Int. Cl.
*G06T 5/20* (2006.01)
*G06T 7/50* (2017.01)

(52) U.S. Cl.
CPC .............. *G06T 5/20* (2013.01); *G06T 7/50* (2017.01); *G06T 2207/10028* (2013.01)

(58) Field of Classification Search
CPC ... G06T 5/20; G06T 7/50; G06T 2207/10028; G06T 5/00; G06T 2207/20024;
(Continued)

(56) References Cited

U.S. PATENT DOCUMENTS 10,484,668 B2 * 11/2019 Nobori .................. G02B 23/02
11,625,002 B2 * 4/2023 Hong ...................... G06T 7/60
348/40

(Continued)

FOREIGN PATENT DOCUMENTS

CN 108648154 * 10/2018
KR 20220149416 * 11/2022

OTHER PUBLICATIONS

Seong B, Kim W, Kim Y, Hyun KA, Jung HI, Lee JS, Yoo J, Joo C. E2E-BPF microscope: extended depth-of-field microscopy using learning-based implementation of binary phase filter and image deconvolution. Light Sci Appl. Nov. 13, 2023;12(1):269. doi: 10.1038/s41377-023-01300-5. PMID: 37953314; PMCID: (Year: 2023).*

(Continued)

*Primary Examiner* — Andrae S Allison
(74) *Attorney, Agent, or Firm* — Knobbe, Martens Olson & Bear, LLP (57) ABSTRACT

In a method for designing a binary phase filter to expand depth of field and for reconstructing images performed by an electronic device according to an embodiment of the present disclosure, the method includes: obtaining images for each depth for a test image based on a binary phase structure set in the binary phase filter; obtaining reconstructed images for each depth by reconstructing the images for each depth based on a model trained to reconstruct an input image; calculating a loss value of the reconstructed images for each depth by comparing the reconstructed images for each depth with the test image; and updating the binary phase structure until the loss value becomes less than or equal to a predefined value.

12 Claims, 7 Drawing Sheets

(58) Field of Classification Search
CPC .. G02B 27/0075; G02B 27/0012; G06N 3/00; G06N 3/045; G06N 3/084
See application file for complete search history.

(56) References Cited

U.S. PATENT DOCUMENTS

| | | | |
|---|---|---|---|
| 2014/0008549 A1* | 1/2014 | Theriault | G01N 21/6458 250/459.1 |
| 2020/0193224 A1* | 6/2020 | Liu | G06F 18/214 |
| 2020/0249501 A1* | 8/2020 | Li | G02C 7/083 |
| 2020/0349729 A1* | 11/2020 | Wu | H04N 13/122 |
| 2023/0003645 A1* | 1/2023 | Han | G01N 21/4795 |
| 2023/0298162 A1* | 9/2023 | Arberet | G06V 10/454 382/131 |
| 2023/0410373 A1* | 12/2023 | Yang | G06T 7/593 |

OTHER PUBLICATIONS

Wu et al., "Extended depth-of-field in holographic imaging using deep-learning-based autofocusing and phase recovery," Optical Society of America, Optica, vol. 5, No. 6, https://doi.org/10.1364/OPTICA.5.000704, May 29, 2018, pp. 704-710. (Year: 2018).*

Peng Wu, Dejie Zhang, Jing Yuan, Shaoqun Zeng, Hui Gong, Qingming Luo, and Xiaoquan Yang, "Large depth-of-field fluorescence microscopy based on deep learning supported by Fresnel incoherent correlation holography," Opt. Express 30, 5177-5191 (2022) (Year: 2022).*

Mazzella, L., Mangeat, T., Giroussens, G. et al. Extended-depth of field random illumination microscopy, EDF-RIM, provides super-resolved projective imaging. Light Sci Appl 13, 285 (2024). https://doi.org/10.1038/s41377-024-01612-0 (Year: 2024).*

Suho Ryu and Chulmin Joo, "Design of binary phase filters for depth-of-focus extension via binarization of axisymmetric aberrations," Opt. Express 25, 30312-30326 (2017) (Year: 2017).*

Benjamin Milgrom, Roy Avrahamy, Tal David, Avi Caspi, Yosef Golovachev, and Shlomo Engelberg, "Extended depth-of-field imaging employing integrated binary phase pupil mask and principal component analysis image fusion," Opt. Express 28, 23862-23873 (2020) (Year: 2020).*

Huang, Naixing, et al. "Deep learning approach for full-field displacement estimation in depth-resolved wavelength-scanning interferometry." Optics & Laser Technology 156 (2022): 108469. (Year: 2022).*

Wu et al., Large depth-of-field fluorescence microscopy based on deep learning supported by Fresnel incoherent correlation holography, vol. 30, No. 4 / Feb. 14, 2022 / Optics Express 5177 (Year: 2022).*

Office Action received in corresponding KR Application No. 10-2022-0135479 dated Sep. 17, 2025.

Tan et al., "CodedStereo: Learned Phase Masks for Large Depth-of-field Stereo," 2021 IEEE/CVF Conference on Computer Vision and Pattern Recognition (CVPR), Apr. 9, 2021.

Tseng et al. "Hyperparameter Optimization in Black-box Image Processing using Differentiable Proxies," ACM SIGGRAPH 2019, Jul. 2019.

* cited by examiner

METHOD FOR DESIGNING BINARY PHASE FILTER EXTENDING FIELD OF DEPTH AND FOR RECONSTRUCTING IMAGES AND ELECTRONIC DEVICE PERFORMING THE SAME

CROSS-REFERENCE TO RELATED APPLICATION

This application claims priority to and the benefit of Korean Patent Application No. 10-2022-0135479, filed on Oct. 20, 2022, the disclosures of which is incorporated herein by reference in its entirety.

FIELD

The present disclosure relates to a method for designing a binary phase filter to expand depth of field and for reconstructing images and an electronic device performing the same.

BACKGROUND

An imaging device including an inspection equipment and a microscope has a trade-off relationship between a resolution and a Depth of Field capable of maintaining the resolution in a depth direction. That is, a device having a high-resolution has inevitably a short-depth, and a device ensuring a long-depth has a low-resolution. This is because the DOF is inversely proportional to the numerical aperture or aperture value of the lens, and the resolution is proportional to the numerical aperture of the lens.

Therefore, there is a need for an improved solution that can overcome the trade-off relationship between depth of field and resolution while expanding the depth of field.

The disclosure of this section is to provide background information relating to the present disclosure. Applicant does not admit that any information contained in this section constitutes prior art.

SUMMARY

Aspects of the present disclosure provide a method of designing a binary phase filter that expands the depth measurement range by more effectively overcoming the trade-off between the depth of field and the resolution.

Aspects of the present disclosure provide images reconstruction method that optimally reconstructs the images obtained from the binary phase filter designed according to the present disclosure.

In one aspect of the present disclosure, a method for designing a binary phase filter to expand depth of field (DOF) and for reconstructing images performed by an electronic device may include: obtaining images for each depth for a test image based on a binary phase structure set in the binary phase filter; obtaining reconstructed images for each depth by reconstructing the images for each depth based on a model trained to reconstruct an input image; calculating a loss value of the reconstructed images for each depth by comparing the reconstructed images for each depth with the test image; and updating the binary phase structure and the model until the loss value becomes less than or equal to a predefined value.

The method may further include selecting the binary phase filter having the binary phase structure whose loss value is less than or equal to the predefined value as a target binary phase filter.

The obtaining the images for each depth may include obtaining the images for each depth by a convolution operation of a point spread function (PSF) for each depth within a target DOF section and the test image.

The obtaining the images for each depth may include identifying the PSF for each depth depending on a phase value of the binary phase structure.

The updating the binary phase structure may include updating the binary phase structure by applying a Penalty Function having an extreme value depending on a phase value of the binary phase structure.

The calculating the loss value may include calculating an average value of the loss value calculated for each of the reconstructed images for each depth.

According to another aspect of the present disclosure, an electronic device for designing a binary phase filter to expand depth of field (DOF) and reconstructing images may include a process, the process may obtain images for each depth for a test image based on a binary phase structure set in the binary phase filter, obtain reconstructed images for each depth by reconstructing the images for each depth based on a model trained to reconstruct an input image, calculating a loss value of the reconstructed images for each depth by comparing the reconstructed images for each depth with the test image, and updating the binary phase structure and the model until the loss value becomes less than or equal to a predefined value.

The processor may select the binary phase filter having the binary phase structure whose loss value is less than or equal to the predefined value as a target binary phase filter.

The processor may obtain the images for each depth by a convolution operation of a Point Spread Function (PSF) for each depth within a target DOF section and the test image.

The processor may identify the PSF for each depth depending on a phase value of the binary phase structure.

The processor may update the binary phase structure by applying a Penalty Function having an extreme value depending on a phase value of the binary phase structure.

The processor may calculate an average value of the loss value calculated for each of reconstructed images for each depth.

According to an embodiment of the present disclosure, the binary phase structure of the binary phase filter is updated so that the reconstructed images are as identical as possible to the test image, thereby providing an optimal binary phase filter.

According to an embodiment of the present disclosure, parameters for image reconstruction are simultaneously modified along with the design of the binary phase filter, so that reconstructed images are as identical as possible to the test image.

According to an embodiment of the present disclosure, the depth of field of an optical system can be expanded using the binary phase structure and the reconstruction model, and the trade-off between depth of field and resolution can be overcome.

DETAILED DESCRIPTION

Hereinafter, embodiments of the present disclosure will be described in detail with reference to the accompanying drawings. The detailed description that will be disclosed below together with the accompanying drawings is intended to explain embodiments of the present disclosure, and is not intended to represent the only embodiments in which the present disclosure can be practiced. In the drawings, parts not related to the description may be omitted to clearly explain the present disclosure, and the same reference numerals may be used for the same or similar components throughout the specification.

Figure 1:
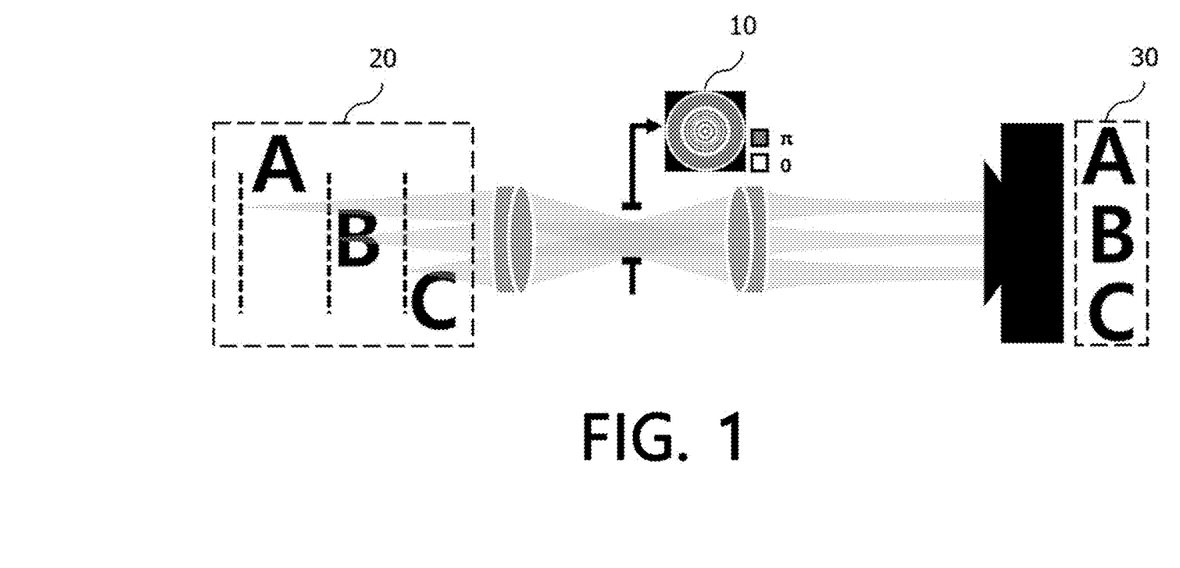
FIG. 1 is a diagram illustrating an improved DOF using a binary phase filter according to an embodiment of the present disclosure.

FIG. 1 is a diagram illustrating an improved DOF using a binary phase filter according to an embodiment of the present disclosure.

FIG. 1 shows a binary phase filter (BPF) 10, subjects 20, and subjects 30 photographed using the BPF 10.

At this time, the subjects 20 are disposed at different distances from each other, and when photographing using an existing video system without the binary phase filter 10, different resolutions may be provided depending on the position of the subjects 20.

In the present disclosure, the binary phase filter 10 is applied to expand the depth of field while preventing or minimizing degradation of the resolution.

According to an embodiment of the present disclosure, the binary phase filter 10 is a filter that delays incident light by a binary phase method, and the light incident on the filter may be modulated by a phase delay of 0° or 180° (0 or $\pi$) depending on the binary phase structure.

Figure 7:
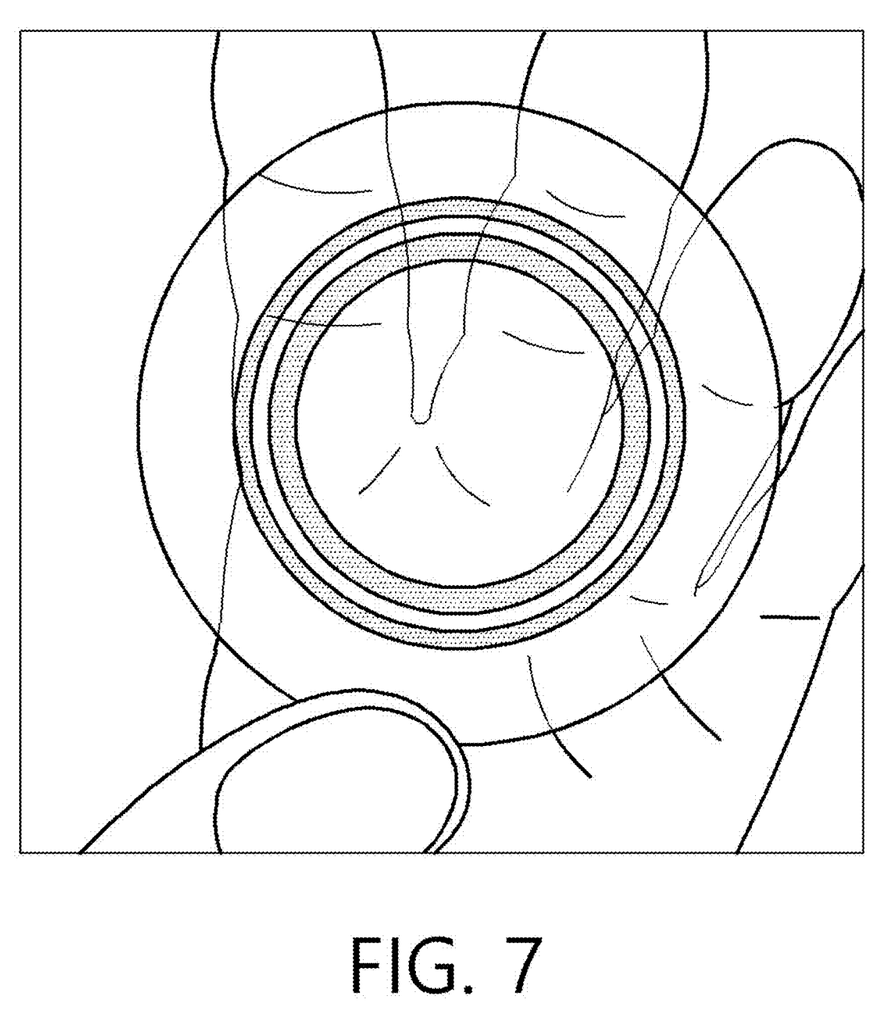
FIG. 7 is a photograph of a binary phase filter designed according to an embodiment of the present disclosure.

As illustrated in FIG. 1, the binary phase filter 10 may include a plurality of patterns spaced apart from each other, and the plurality of patterns may be concentric annular patterns having different widths spaced apart in a radial direction. The binary phase filter 10 may have a binary structure in which light passing through a portion representing 0 or $\pi$ has an arbitrary optical path difference, or transmits or reflects light. At this time, the binary phase structure of the binary phase filter 10 may be designed in various ways. An example of the binary phase filter manufactured through the actual design is illustrated in FIG. 7.

According to an embodiment of the present disclosure, when the binary phase filter 10 is adopted, it can be confirmed that the depth of field is expanded, and the subjects 20 at different distances are clearly imaged like the photographed subject 30.

The binary phase filter 10 according to an embodiment of the present disclosure may interact with the optical elements constituting the optical system, and may be disposed between lenses arranged along the optical axis.

The imaging system includes the binary phase filter 10, so that all subjects outside the depth and within the depth range can be imaged at high resolution.

The present disclosure proposes a method of designing the binary phase filter that can expand the depth of field and overcome a trade-off between the DOE; and the resolution more effectively.

The present disclosure proposes an optimal image processing method that jointly learns (jointly-optimized/end-to-end optimized) by generating the binary phase filter and image processing network based on machine learning (ML).

As described above, the design and images reconstruction method of the binary phase filter may be performed by an electronic device, and the electronic device may be implemented as a computer, a server, a notebook, a smartphone, a tablet PC, or the like.

Hereinafter, a method for designing a binary phase filter to expand DOE and reconstructing images according to an embodiment of the present disclosure, and the configuration and operation of the electronic device performing the same will be described in detail with reference to the drawings.

Figure 2:
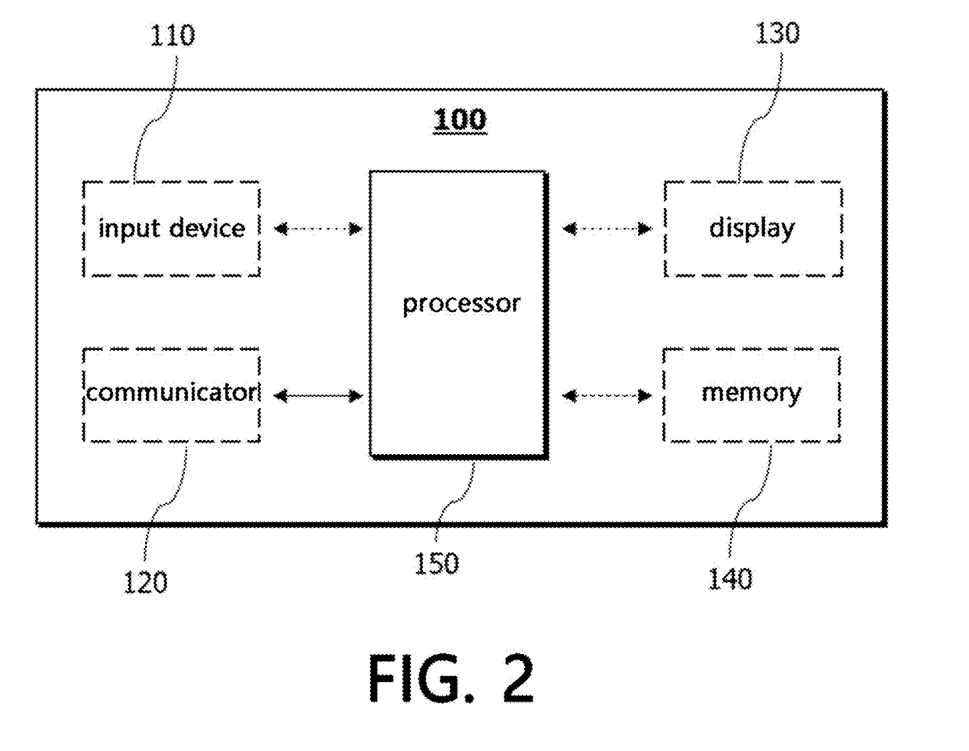
FIG. 2 is a block diagram illustrating the configuration of the electronic device according to an embodiment of the present disclosure.

FIG. 2 is a block diagram illustrating the configuration of the electronic device according to an embodiment of the present disclosure.

The electronic device 100 according to an embodiment of the present disclosure includes an input device 110, a communicator 120, a display 130, a memory 140, and a processor 150.

The input device 110 generates input data in response to a user input of the electronic device 100. For example, the user input may be a user input for starting the operation of the electronic device 100, and a user input for setting a reference value of the loss value, and may be applied without limitation to the case of a user input that may be necessary for designing and images reconstruction of the binary phase filter.

The input device 110 includes at least one input means. The input device 110 may include a keyboard, a keypad, a dome switch, a touch panel, a touch key, a mouse, a menu button, and the like.

The communicator 120 communicates with an external device such as a server to receive a test image, an image reconstruction model, and the like. To this end, the communicator 120 may communicate with the external device such as 5G (5th generation communication), LTE-A (long term evolution-advanced), LTE (long term evolution), Wi-Fi (wireless fidelity), and the like.

The display 130 displays data according to the operation of the electronic device 100. The display unit 130 may display a screen for displaying the binary phase filter, a screen for displaying an image for each depth, a screen for displaying reconstructed images for each depth, and a screen for receiving a user input.

The display 130 includes a liquid crystal display (LCD), a light emitting diode (LED) display, an organic LED (OLED) display, a micro electro mechanical systems (MEMS) display, and an electronic paper display. The display 130 may be combined with the input device 110 and may be implemented as a touch screen.

The memory 140 stores operation programs of the electronic device 100. The memory 140 includes a storage of non-volatile attributes capable of storing data (information) regardless of whether power is provided or not, and a memory of volatile attributes capable of storing data if the processor 150 is loaded and power is not provided. The storage includes flash memory, hard-disc drive (HDD), solid-state drive (SSD), read only memory (ROM), and the like, and the memory includes buffers, random access memory (RAM), and the like.

The memory 140 may store an arithmetic program that may be necessary in the process of obtaining images for each depth, reconstructing images for each depth, calculating a loss value of the reconstructed images for each depth, and updating a binary phase structure, and the like.

The processor 150 may control at least one other component (e.g., hardware or software component) of the electronic device 100 by executing software such as a program, and can perform various data processing or calculations.

The processor 150 obtains the images for each depth for the test image based on the binary phase structure set in the binary phase filter, obtains reconstructed images for each depth by reconstructing the images for each depth based on the model trained to reconstruct the input image, calculates a loss value of the reconstructed images for each depth by comparing the reconstructed images for each depth with the test image, and updates the binary phase structure until the loss value becomes equal to or less than a predefined value.

Meanwhile, the processor 150 may perform at least some of data analysis, processing, and result information generation for performing the above operations using at least one of machine learning, neural network, or deep learning algorithm as a rule-based or artificial intelligence algorithm. Examples of neural networks may include models such as Convolutional Neural Network (CNN), Deep Neural Network (DNN), and Recurrent Neural Network (RNN).

Figure 3:
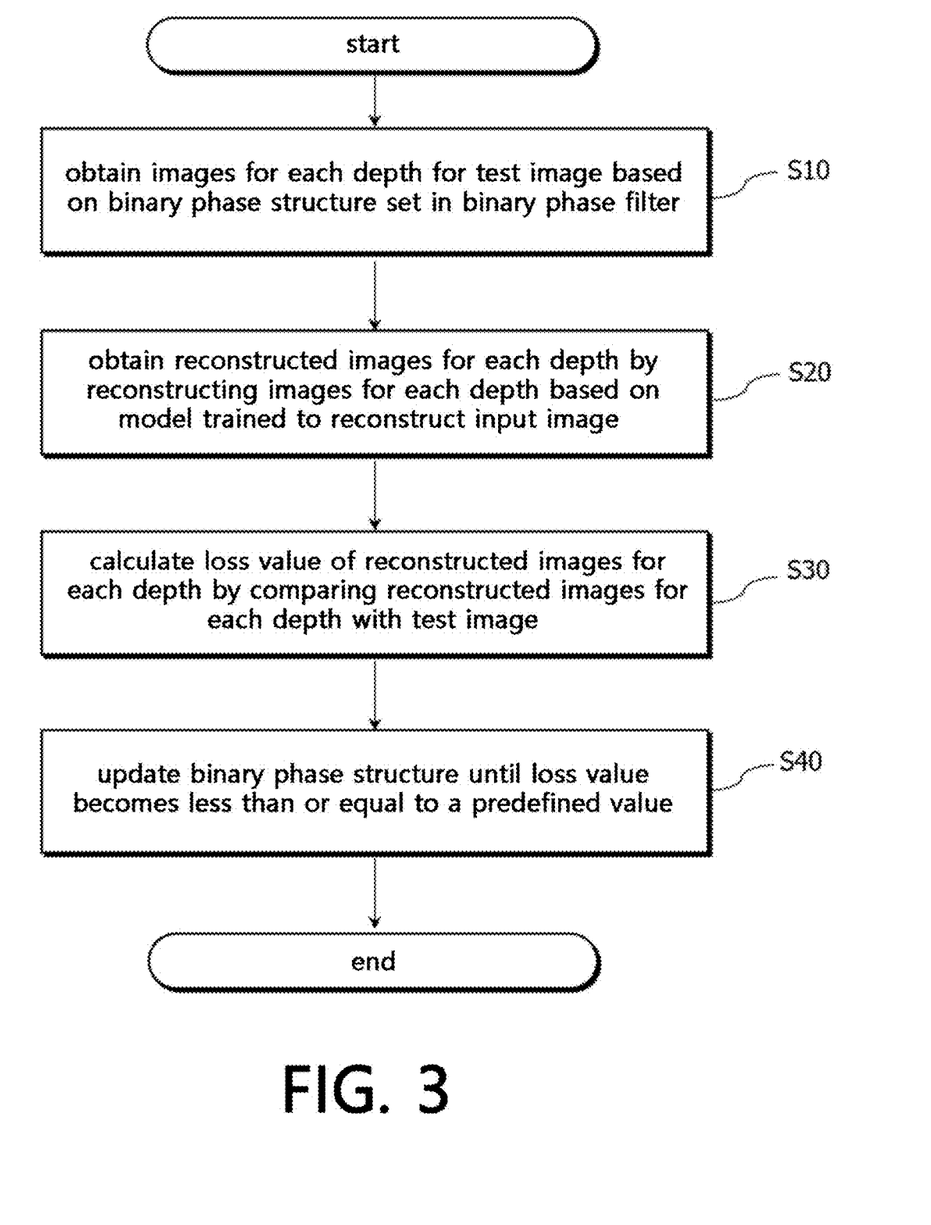
FIG. 3 is a flowchart of an electronic device according to the first embodiment of the present disclosure.

FIG. 3 is a flowchart of an electronic device according to the first embodiment of the present disclosure.

According to an embodiment of the present disclosure, the processor 150 obtains images for each depth for a test image based on a binary phase structure set in a binary phase filter (Step 10).

According to an embodiment of the present disclosure, when first starting to design the binary phase filter, the binary phase structure may have an initial value. At this time, the initial value may be selected as an arbitrary value or a specific function.

Thereafter, the binary phase structure of the binary phase filter may be continuously updated until it has the most appropriate binary phase structure according to the quality evaluation.

According to an embodiment of the present disclosure, the test image may be an original image and may be a reference image for evaluating the quality of later reconstructed images.

The processor 150 obtains the images for each depth for the test image based on an initially selected binary phase structure (which is referred to as an updated binary phase structure after being updated, hereinafter referred to as a binary phase structure for convenience).

The processor 150 may obtain the images for each depth by a convolution operation of a point spread function (PSF) calculated from an optical system and the test image.

The point spread function is determined by the optical elements that make up the optical system, including the binary phase filter. For example, it may be changed by a lens, an aperture, a filter, etc. that constitutes an image system. At this time, the point spread function is calculated for each depth and performs a convolution operation with the test image, respectively, to obtain the images for each depth. The process of obtaining the images for each depth will be described in detail with reference to FIG. 4.

In this case, obtaining the image is also referred to as simulating the image. In the present disclosure, an image result of an imaging system including a binary phase filter is simulated to design an optimal binary phase filter and an image reconstruction algorithm. At this time, various methods of simulating image simulation can be applied to this embodiment.

According to an embodiment of the present disclosure, the processor 150 obtains reconstructed images for each depth by reconstructing the images for each depth based on a model trained to reconstruct an input image (Step 20).

According to an embodiment of the present disclosure, the image quality for each depth would have been lower than that of the test image due to convolution with the point spread function, so the processor 150 reconstructs the images for each depth and improves the image. At this time, the image may be reconstructed using, for example, a neural network, but various image reconstruction algorithms having separate parameters that may be necessary for learning may be used.

According to an embodiment of the present disclosure, the model trained to reconstruct the input image may be received from an external source or may be learned by the processor 150. The process of learning the model will be described in detail with reference to FIG. 6.

According to an embodiment of the present disclosure, if a plurality of images of different depths are obtained, the same images reconstruction is performed for each individual image.

According to an embodiment of the present disclosure, the processor 150 calculates a loss value of the reconstructed images for each depth by comparing the reconstructed images for each depth with the test image (Step 30)

The processor 150 may calculate loss (cost) by comparing and evaluating the quality of the reconstructed images for each depth. In general, the loss has a low value when the similarity between the test image and the reconstructed images is high. Therefore, the closer the loss value is to zero, the more similar the reconstructed images is to the original image.

The processor 150 may calculate the loss value for each reconstruction image for each depth, and identify the average value of the loss values as the loss value of the reconstruction images for each depth.

The optimal binary phase filter according o an embodiment of the present disclosure refers to a filter having a binary phase structure when the loss caused by matching the reconstructed images and the test image is less than or equal to a predefined value. In this case, the predefined value may be zero, but is not limited to any one and may have a range other than a specific value. The predefined value may be set by the user.

In this case, in order for the images reconstruction result to match the original image and generate low loss, the binary phase filter may need to provide the same images at different depths. For the same purpose, the images reconstruction model should be able to reconstruct images of different depths into the original image using only one reconstruction method.

According to an embodiment of the present disclosure, the processor 150 updates the binary phase structure until the loss value becomes less than or equal to a predefined value (Step 40).

If the loss value is greater than the predefined value, the processor 150 may determine that the corresponding binary phase filter is not suitable and update the binary phase structure again. In the present disclosure, update means adjusting the values of variables defining the binary phase filter.

The present disclosure proposes a gradient descent method as an optimal design method for updating the binary phase structure. The gradient descent method is an algorithm that modifies design variables every iteration so that the losses generated for the reconstructed images are minimized, and may be used as a representative example of stochastic gradient descent (SGD), momentum, Ada Grad, etc.

However, an algorithm based on the gradient descent method may need to be differentiable in all calculation processes, but the binary phase filter to be optimized in the present disclosure cannot be differentiated because it has a discrete structure in the radial coordinate.

Therefore, in the present disclosure, the binary phase structure can be updated by applying a penalty function having an extreme value depending on a phase value of the binary phase structure. If the penalty function is used for the binary phase filter, it is possible to differentiate the modulation value of the binary phase filter. At this time, the modulation value of the binary phase filter may be optical phase difference, optical absorption rate, optical reflectance rate, etc.

According to an embodiment of the present disclosure, the binary phase structure of the binary phase filter is updated so that the reconstructed images are as identical as possible to the test image, thereby providing an optimal binary phase filter.

Figure 4:
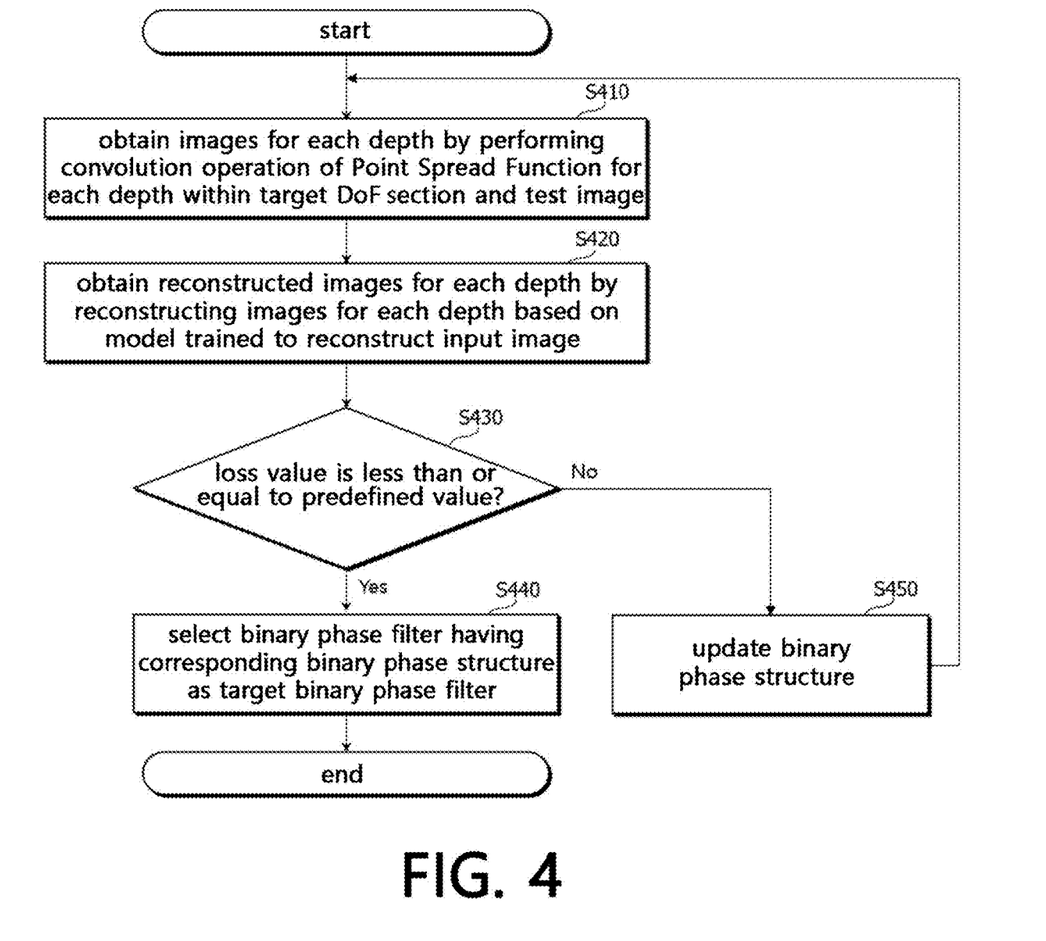
FIG. 4 is a flowchart illustrating an operation of the electronic device according to the second embodiment of the present disclosure.

FIG. 4 is a flowchart illustrating an operation of the electronic device according to the second embodiment of the present disclosure.

The operation flowchart of the electronic device according to an embodiment of the present disclosure may somewhat overlap with FIG. 3, and detailed descriptions thereof will be omitted.

According to an embodiment of the present disclosure, the processor 150 obtains images for each depth by performing a convolution operation of a point spread function for each depth within a target depth section and a test image (Step 410).

More specifically, the processor 150 may derive at least one point spread function capable of simulating a subject in the target DOF section from a binary phase filter.

For example, when the target DOF section is at a distance of d2 to d2 from an optical system, the processor may calculate n+1 point spread functions that can simulate the subject at a distance of d1, d1+(d2−d1)*1/n, d1+(d2−d1)*2/n, . . . , d1+(d2−d1)*(n−1)/n, d2 from the binary phase filter.

The processor 150 may perform a convolution operation of the test image with a plurality of point spread functions corresponding to the target DOF section to simulate the test image in the range of the distance from the imaging device corresponding to the target DOF.

According to an embodiment of the present disclosure, the processor 150 obtains reconstructed images for each depth by reconstructing the images for each depth based on a model trained to reconstruct an input image (Step 420).

According to an embodiment of the present disclosure, the processor 150 identifies whether a loss value is less than or equal to a predefined value (Step 430).

At this time, the quality of the image may be quantified from the simulated image to an evaluation value related to the image quality. The method of quantifying the image quality may include 1) a full-reference evaluation method for referencing to the original image (image without distortion) or 2) a no-reference evaluation method for not referencing to the original image.

More specifically, 1) the full-reference evaluation method may include root mean square error (RMSE), peak signal to noise ratio (PSNR), and structure similarity (SSIM), and 2) the no-reference evaluation method may include blind/referenceless image spatial quality estimator (BRISQUE), natural image quality evaluator (NIQE), and perception based image quality estimator (PIQE).

According to an embodiment of the present disclosure, when the loss value is less than or equal to the predefined value (Yes in Step 430), the processor 150 selects a binary phase filter having the corresponding binary phase structure as the target binary phase filter (Step 440).

According to an embodiment of the present disclosure, when the loss value is not less than or equal to the predefined value (No in Step 430), the processor 150 updates the binary phase structure (Step 450) and returns to Step 410.

As described above with reference to Step 40 of FIG. 3 in the present disclosure, the binary phase structure may be updated based on the gradient descent method. This may be expressed in Equation 1 as follows:

$$\overline{\phi}_{t+1} = \overline{\phi}_t - \alpha \frac{\partial \mathcal{L}(\overline{\phi})}{\partial \overline{\phi}} \quad (1)$$

Here, $\overline{\phi}_t$ is a phase value matrix of the t-th binary phase filter, and $\mathcal{L}$ is a loss function. At this time, the loss function should be differentiable with respect to $\overline{\phi}$ and expressed in Equation 2 as follows.

$$\frac{\partial \mathcal{L}(\overline{\phi})}{\partial \overline{\phi}} = \frac{\partial}{\partial \overline{\phi}}(y - \hat{y}) = \frac{\partial}{\partial \overline{\phi}}(y - y \otimes h(v, z)) = \frac{\partial}{\partial \overline{\phi}}(y - y \otimes (P(\rho) \cdot \overline{\Phi}_t(\overline{\phi}) \cdot \exp(-i2\pi\psi\rho^2))) \quad (2)$$

Here, $\overline{\Phi}_t(\overline{\phi})$ is a binary phase filter with to which the penalty function is applied, and since the design method proposed in this embodiment is differentiable, it can be seen that the gradient descent method may be applied.

Figure 5:
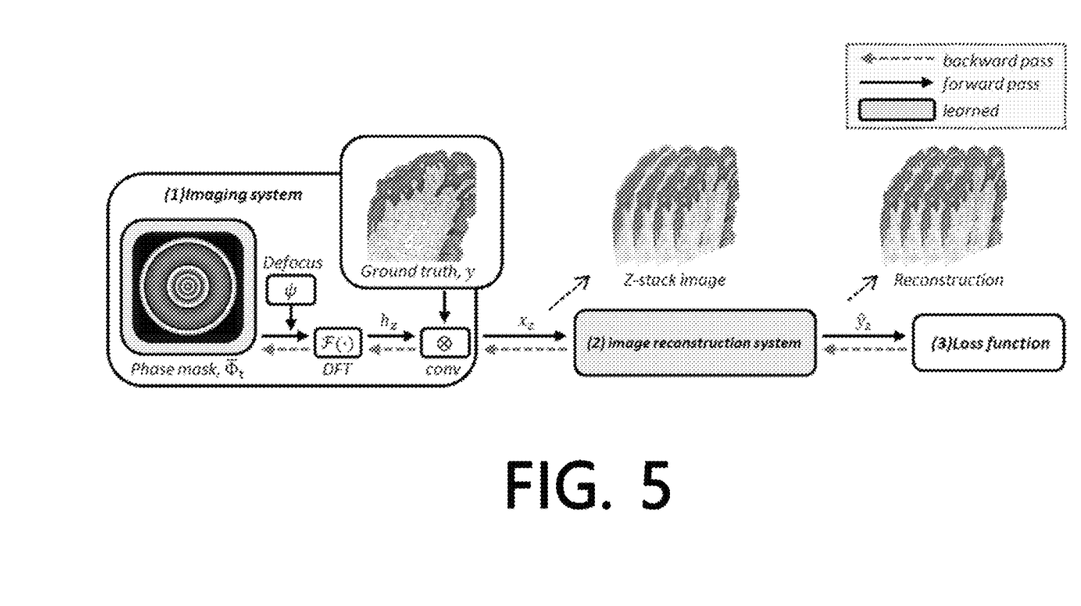
FIG. 5 is a schematic diagram illustrating a method for designing a binary phase filter and reconstructing an image according to an embodiment of the present disclosure as a whole.

FIG. 5 is a schematic diagram illustrating a method for designing a binary phase filter and reconstructing an image according to an embodiment of the present disclosure as a whole.

FIG. 5 schematically illustrates the contents described in FIGS. 3 and 4.

It can be broadly divided into a step of obtaining images for each depth ((1) Imaging system), a step of reconstructing the images for each depth ((2) Image reconstruction system), and a step of comparing the reconstructed images and an original image ((3) Loss function).

Each step is described in detail as follows.

(1) Imaging system

The image of the optical system may be expressed as Equation 3 using the point spread function, and the convolution of the original image and the point spread function represents the image formed.

$$I(v) = I^T(v) \otimes h(v) \quad (3)$$

Here, v is radial optical coordinate defined as v=(2π/λ) rNA with the wavelength λ, the radial coordinate in the image plane r, and the numerical aperture NA. I is the image formed, $I^T$ is the original image, and h is the point spread function.

The point spread function may be expressed as Equation 4.

$$h(v) = |\mathcal{F}\{P(\rho)\}|^2 \quad (4)$$

Here, $P(\rho)$ is a Pupil function of the optical system, and $\rho$ is the normalized radial coordinate.

The optical system may simulate images at different depths. The image of a specific depth can be expressed by adding "quadratic phase wave-front error" to the aperture, and the parameter $\psi$ is introduced to quantify the depth condition. The parameter $\psi$ is defined in Equation 5 as follows.

$$\psi = \frac{\Delta z}{\lambda} \frac{NA^2}{2n} \quad (5)$$

Here, $\Delta z$ is the distance of movement of the object from the focal plane, and n is the refractive index of the medium. The parameter $\psi$ is the wave-front error of the outermost aperture, and may be applied to the Pupil function as shown in Equation 6 as follows.

$$P_z = P(\rho)\exp(-i2\pi\psi\rho^2) \quad (6)$$

Here, $P_z$ is the aperture corresponding to depth z.

The binary phase filter (phase mask, $\overline{\Phi}_t$) to be designed in the present disclosure is trained through iteration of t times. In this case, the design variable of the binary phase filter is the phase delay value $\overline{\Phi}_t$ of the binary phase filter.

$\overline{\phi}$ is a matrix with i elements in the radial direction, and its value may be changed through learning each time. The binary phase filter may change the point spread score by manipulating the phase of the aperture as shown in Equation 7 as follows.

$$P_{PF}(\overline{\phi}) = P(\rho) \cdot \overline{\Phi}_t(\overline{\phi}(\rho))$$

$$\overline{\phi} = (\phi_1, \phi_2, \ldots, \phi_i) \quad (7)$$

Here, $P_{PF}$ is an aperture to which the binary phase filter is applied, $\overline{\Phi}_t(\overline{\phi})$ is the binary phase filter to be learned, and the operator · represents a Hadamard product.

In the present disclosure, the binary phase filter is repeated every time, and the penalty function is applied to provide an optimal binary phase filter design from a continuous phase structure. The process of obtaining for images for each depth, reconstructing the images, and comparing the images are repeated forward pass and backward pass every time, and the slope of the phase value is calculated, and the penalty function can converge at the point of forming its extreme value. An example of penalty function can be expressed by Equation 8 as follows.

$$\overline{\Phi}_t(\overline{\phi}) = a\overline{\phi}^3 - b\overline{\phi}^5 + c \quad (8)$$

Here, $\phi$ is the phase value of the phase filter, $f(\phi)$ is the penalty function, and (a, b, c) represent the parameters of the function.

As described above with respect to Step 10 of FIG. 3, the initial value of the binary phase filter may be selected as an arbitrary value or a specific function. Equation 9 represents a specific example thereof.

$$\overline{\phi}_0 = \phi(\rho) = \exp\{i \cdot N(0,\sigma)\}$$

$$\overline{\phi}_0 = \phi(\rho) = P_{SA}(\rho) = \exp(-i2\pi\gamma\rho^4) \quad (9)$$

Here, $N(0,\sigma)$ is a noise function with mean 0 and variance $\sigma$, and $P_{SA}(\rho) = \exp(-i2\pi\gamma\rho^4)$ represents a Spherical Aberration function known to have depth expansion performance.

The point spread function that changes depending on the depth to be solved by the present technology may be expressed as Equation 10 by combining the various elements described above.

$$P(\overline{\phi};\psi) = P(\rho) \cdot P_{PF}(\overline{\phi}) \cdot \exp(-i2\pi\psi\rho^2)$$

$$h(v,z) = |\mathcal{F}\{P(\overline{\phi};\psi)\}|^2 \quad (10)$$

Here, h(v, z) is the point spread function corresponding to depth z, and in the same manner as Equation 1, the image corresponding to depth z may be simulated as Equation 11 as follows.

$$x_z = y \otimes h(v,z) \quad (11)$$

Here, $x_z$ is the output image, y is the original image, and h(v,z) is the point spread function corresponding to depth z.

(2) Image Reconstruction System

The optimal design method described in relation to Step 40 of FIG. 3 above presents both method for designing a binary phase filter and reconstructing images corresponding to the designed binary phase filter.

The details of the related art will be described with reference to FIG. 6.

(3) Loss Function

This method was proposed to learn both the binary phase filter design and the image reconstruction method for each t iteration. The binary phase filter and the image reconstruction method are learned to minimize the loss function. The loss function performs a comparison between the original image y and the reconstructed images $\hat{y}$ input to the algorithm. As shown in Table 1, the loss function may use RMSE and SSIM, but the present disclosure is not limited thereto.

TABLE 1

| RMSE (root mean square error) | SSIM (structure similarity) |
|---|---|
| $\mathcal{L}_{RMSE} = \frac{1}{\sqrt{N}}\|y - \hat{y}\|_2$ | $\mathcal{L}_{SSIM} = 1 - \frac{(2\mu_y * 2\mu_{\hat{y}} + c_y)(2\sigma_{y\hat{y}} + c_{\hat{y}})}{(\mu_y^2 + \mu_{\hat{y}}^2 + c_{\hat{y}})(\sigma_y^2 + \sigma_{\hat{y}}^2 + c_{\hat{y}})}$ |

Here, N is the total number of pixels in the images, y and $\hat{y}$ are the original and reconstructed images, respectively, $\mu$ and $\sigma$ are the mean and variance, respectively, and c is a constant to prevent divergence.

Since the reconstructed images exist at various depths z, the loss function may pursue an ideal phase filter with image quality that does not change depending on the depth.

Additionally, an image quality score such as SSIM, that may calculate similarity to the original image regardless of the brightness or dynamic range of the reconstructed images, may be used.

Figure 6:
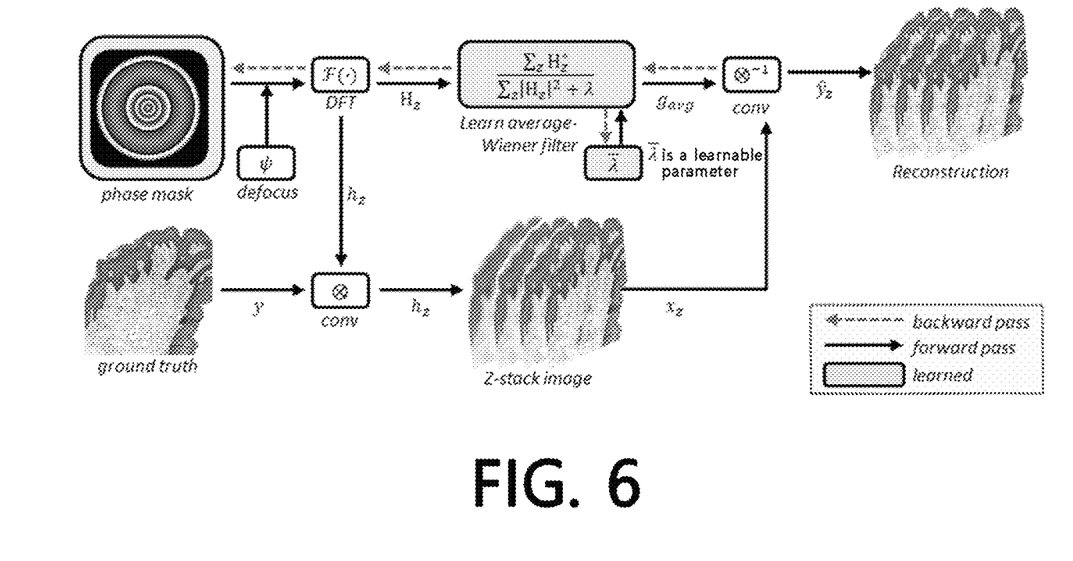
FIG. 6 is a diagram illustrating a picture reconstructing images according to an embodiment of the present disclosure.

FIG. 6 is a diagram illustrating a picture reconstructing images according to an embodiment of the present disclosure.

Image reconstruction may be performed by various methods, and as an example of point spread function-based image reconstructing, images may be reconstructed through deconvolution of the point spread function. Exemplary equation is as follows.

$$\hat{y}_z = x_z \otimes^{-1} g \quad (12)$$

$$g = \mathcal{F}^{-1}\left\{\frac{\sum_z H_z^*}{\sum_z |H_z|^2 + \lambda}\right\}, H_z = \mathcal{F}\{h_z\}$$

Here, $x_z$ and $\hat{y}_z$ are the images before and after reconstruction at depth z, respectively, and $\overline{\lambda}$ is a learnable parameter. The superscript * denotes the complex conjugate operator.

As another example, reconstructed images for each depth may be obtained by reconstructing images for each depth based on a model trained to reconstruct an input image. At this time, the learning model may use a convolution neural network (CNN), a DNN, a U-net, a Resnet, or the like among the DNN. The learning model generates an output image $\hat{y}_z$ for the input image $x_z$.

In the present disclosure, a regularization parameter $\overline{\lambda}$ that reduces noise of the reconstructed images may be trained along with an image reconstructing model to further increase an image reconstructing performance.

At this time, the deconvolution method and the learning model method may be applied simultaneously or respectively, and are not limited to anyone.

The algorithm shown in FIG. 6 continues to repeat and simultaneously modifies the parameters for image reconstruction along with the binary phase filter design. Therefore, it is possible to perform image reconstruction optimized for the designed binary phase filter in accordance with the optimization of the design of the binary phase filter.

FIG. 7 is a photograph of a binary phase filter designed according to an embodiment of the present disclosure.

The binary phase filter can be implemented by a spatial light modulator, a grating and a grating light valve.

The binary phase filter 10 may have any optical path difference in light passing through a portion representing 0 or π, and the optical path difference may be implemented by a physical step difference between the two portions representing 0 or π. The physical steps difference representing 0 or π can be implemented by imprinting, thin film deposition, wet/dry etching, and holographic film attachment.

Equation 13 can be used to convert the design results of the present technology into physical figures. And, the values utilized in the implementation of the binary phase filter shown in FIG. 7 are shown in Table 2.

$$\text{Optical Path Difference} = OPD = (n_2 - n_1) \times t$$

$$\text{Phase delay value} = \delta = \frac{2\pi}{\lambda} \times OPD \qquad (13)$$

TABLE 2

| Index | symbol | value |
|---|---|---|
| BPM parameter | R = pupil diameter | 18.8[mm] |
| BPM parameter | $\bar{p} = \{0, p_0, p_1, \ldots, P_n, 1\} * R$ | {0, 0.637795276, 0.763779528, 0.850393701, 0.897637795, 1}*18.8[mm] |
| OPD parameter | λ | 600[nm] |
| OPD parameter | t | 580.5[nm] |
| OPD parameter | $n_2 - n_1 = n_{substrate} - n_{air}$ | 0.5168 |
| OPD parameter | OPD | 300[nm] |
| OPD parameter | δ | π |

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Although the disclosure hereof is detailed and exact to enable those skilled in the art to practice embodiments of the invention, the embodiments disclosed herein are merely examples of the disclosure, which may be embodied in other specific structure and/or configuration. While various embodiments have been described, the details may be changed without departing from the disclosure, which is defined by the claims.

It should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Thus, it is intended that the scope of the inventions herein disclosed should not be limited by the particular embodiments described above.

What is claimed is:

1. A method for designing a binary phase filter to expand depth of field (DOF) and for reconstructing images performed by an electronic device, the method comprising:
   obtaining images for each depth for a test image based on a binary phase structure set in the binary phase filter;
   obtaining reconstructed images for each depth by reconstructing the images for each depth based on a model trained to reconstruct an input image;
   calculating a loss value of the reconstructed images for each depth by comparing the reconstructed images for each depth with the test image; and
   updating the binary phase structure until the loss value becomes less than or equal to a predefined value.

2. The method of claim 1, further comprising:
   selecting the binary phase filter having the binary phase structure whose loss value is less than or equal to the predefined value as a target binary phase filter.

3. The method of claim 1, wherein obtaining the images for each depth comprises:
   obtaining the images for each depth by a convolution operation of a point spread function (PSF) for each depth within a target DOF section and the test image.

4. The method of claim 3, wherein obtaining the images for each depth comprises:
   identifying the PSF for each depth, depending on a phase value of the binary phase structure.

5. The method of claim 1, wherein updating the binary phase structure comprises:
   updating the binary phase structure by applying a Penalty Function having an extreme value depending on a phase value of the binary phase structure.

6. The method of claim 1, wherein calculating the loss value comprises:
   calculating an average value of the loss value calculated for each of the reconstructed images for each depth.

7. An electronic device for designing a binary phase filter to expand depth of field (DOF) and for reconstructing images, the electronic device comprising a processor configured to:

obtain images for each depth for a test image based on a binary phase structure set in the binary phase filter;

obtain reconstructed images for each depth by reconstructing the images for each depth based on a model, which could incorporate physical image formation process, trained to reconstruct an input image;

calculate a loss value of the reconstructed images for each depth by comparing the reconstructed images for each depth with the test image; and update the binary phase structure until the loss value becomes less than or equal to a predefined value.

8. The electronic device of claim 7, wherein the processor is configured to:

select the binary phase filter having the binary phase structure whose loss value is less than or equal to the predefined value as a target binary phase filter.

9. The electronic device of claim 7, wherein the processor is configured to:

obtain the images for each depth by a convolution operation of a Point Spread Function (PSF) for each depth within a target DOF section and the test image.

10. The electronic device of claim 9, wherein the processor is configured to:

identify the PSF for each depth depending on a phase value of the binary phase structure.

11. The electronic device of claim 7, wherein the processor is configured to:

update the binary phase structure by applying a Penalty Function having an extreme value depending on a phase value of the binary phase structure.

12. The electronic device of claim 7, wherein the processor is configured to:

calculate an average value of the loss value calculated for each of the reconstructed images for each depth.

\* \* \* \* \*